US012145342B2

(12) United States Patent
Mitton et al.

(10) Patent No.: US 12,145,342 B2
(45) Date of Patent: Nov. 19, 2024

(54) CREPING BLADE FOR TISSUE MAKING

(71) Applicant: Irving Consumer Products Limited, Dieppe (CA)

(72) Inventors: Samuel Mitton, Dieppe (CA); Rick Flinn, Saint John (CA); Hannah Caron, Sackville (CA)

(73) Assignee: Irving Consumer Products Limited, Dieppe (CA)

( * ) Notice: Subject to any disclaimer, the term of this patent is extended or adjusted under 35 U.S.C. 154(b) by 21 days.

(21) Appl. No.: 17/824,978

(22) Filed: May 26, 2022

(65) Prior Publication Data

US 2022/0379577 A1 Dec. 1, 2022

Related U.S. Application Data

(60) Provisional application No. 63/193,388, filed on May 26, 2021.

(51) Int. Cl.

*B21F 1/00* (2006.01)
*B05C 11/04* (2006.01)
*B31F 1/14* (2006.01)
*D21G 3/00* (2006.01)

(52) U.S. Cl.

CPC ............ *B31F 1/145* (2013.01); *B05C 11/045* (2013.01); *D21G 3/005* (2013.01)

(58) Field of Classification Search

CPC ........ B31F 1/145; B05C 11/045; D21G 3/005
See application file for complete search history.

(56) References Cited

U.S. PATENT DOCUMENTS

| | | | | |
|---|---|---|---|---|
| 3,507,745 A | 4/1970 | Fuerst | | |
| 6,207,021 B1 * | 3/2001 | Eriksson | B31F 1/145 34/120 |
| 6,527,913 B1 | 3/2003 | Johnson et al. | |
| 7,431,801 B2 * | 10/2008 | Conn | B31F 1/145 15/256.51 |
| 2005/0051292 A1 * | 3/2005 | Laithier | D21G 3/00 162/280 |

FOREIGN PATENT DOCUMENTS

| | | |
|---|---|---|
| JP | 2005169907 A * | 6/2005 |

* cited by examiner

*Primary Examiner* — Emmanuel S Luk
*Assistant Examiner* — Stephen M Russell

(57) ABSTRACT

A creping blade having a first side face, a second side face, and a shelf extending from the first side face to the second side face, with a scraping edge at the intersection of the first side face and the shelf. The shelf has a first section having a first coefficient of friction and a second section have a second coefficient of friction and the second coefficient of friction is greater than the first coefficient of friction.

13 Claims, 14 Drawing Sheets

CREPING BLADE FOR TISSUE MAKING

CROSS-REFERENCE TO RELATED APPLICATIONS

This application claims the benefit of U.S. Provisional Application No. 63/193,388 filed on May 26, 2021, which is incorporated by reference herein in its entirety.

FIELD

The described embodiments relate generally to a creping blade used for making tissue and a method of using the same, and in particular, a creping blade that has a shelf with sections of varied coefficients of friction.

BACKGROUND

Cellulosic products, such as tissue, are typically made by creating a pulp and water mixture that moves through a series of drying steps in a manufacturing process. The paper or tissue machine used to create the product includes a series of drying stages that reduce the water content of the pulp and water mixture. A type of drying stage includes a drum that receives a web of cellulosic material. The drying drum continues to remove water content from the web before the web is removed from the drum by a creping blade.

A problem with the creping process is that creping the cellulosic web from the drying drum may result in a finished product with limited caliper. It is desirable to provide a creping blade that can provide increased caliper to the web of cellulosic material.

SUMMARY

The various embodiments described herein generally relate to a creping blade and a method of creping a web.

In accordance with these embodiments, there is provided a creping blade comprising:

- a first side face, a second side face, and a shelf extending from the first side face to the second side face; and
- a scraping edge at the intersection of the first side face and the shelf, wherein the shelf has a first section having a first coefficient of friction and a second section have a second coefficient of friction and the second coefficient of friction is greater than the first coefficient of friction.

In any embodiment, the first section may be positioned proximate to the scraping edge.

In any embodiment, the second section may be spaced apart from the scraping edge by the first section.

In any embodiment, the second section may be placed proximate to the scraping edge.

In any embodiment, the first section may be spaced apart from the scraping edge by the second section.

In any embodiment, the shelf may extend at an angle from the first side face forming a wear angle between the drum and the scraping edge.

In any embodiment, the shelf may further comprise a third section, the third section extending from the second section to the second side face.

In any embodiment, the third section may extend from the second side face to the second section at an angle relative to the second section.

In any embodiment, the first section may have a first length, the second section has a second length, and the second length is at least three times the first length.

In any embodiment, the creping blade may be made of steel.

In any embodiment, the creping blade may be made of ceramic.

In any embodiment, the creping blade may further comprise a ceramic tip that forms the scraping edge.

In accordance with another embodiment there is provided a method of creping a web, the method comprising:

- supporting the web on a drum;
- rotating the drum to move a first length of the web proximate to a creping blade such that the creping blade removes the first length of the web from the drum, the creping blade having a first section with a first coefficient of friction and a second section with a second coefficient of friction greater than the first coefficient of friction;
- moving the first length of the web along the first section of the creping blade;
- removing a second length of the web from the drum with the creping blade;
- moving the first length of the web along the second section of the creping blade;
- forming the second length of the web into at least one microfold as the first length of the web contacts the second section of the creping blade; and
- forming the second length of the web into at least one macrofold;

In any embodiment, the method may further comprise forming the second length into a plurality of microfolds.

In any embodiment, the method may further comprise forming the second length into a plurality of macrofolds.

In any embodiment, the first section may have a first length, the second section may have a second length, and the second length may be at least three times the first length.

In any embodiment, the creping blade may further comprise a scraping edge and the second section may be spaced apart from the scraping edge by the first section.

BRIEF DESCRIPTION OF THE DRAWINGS

Several embodiments will now be described in detail with reference to the drawings, in which.

Figure 1:
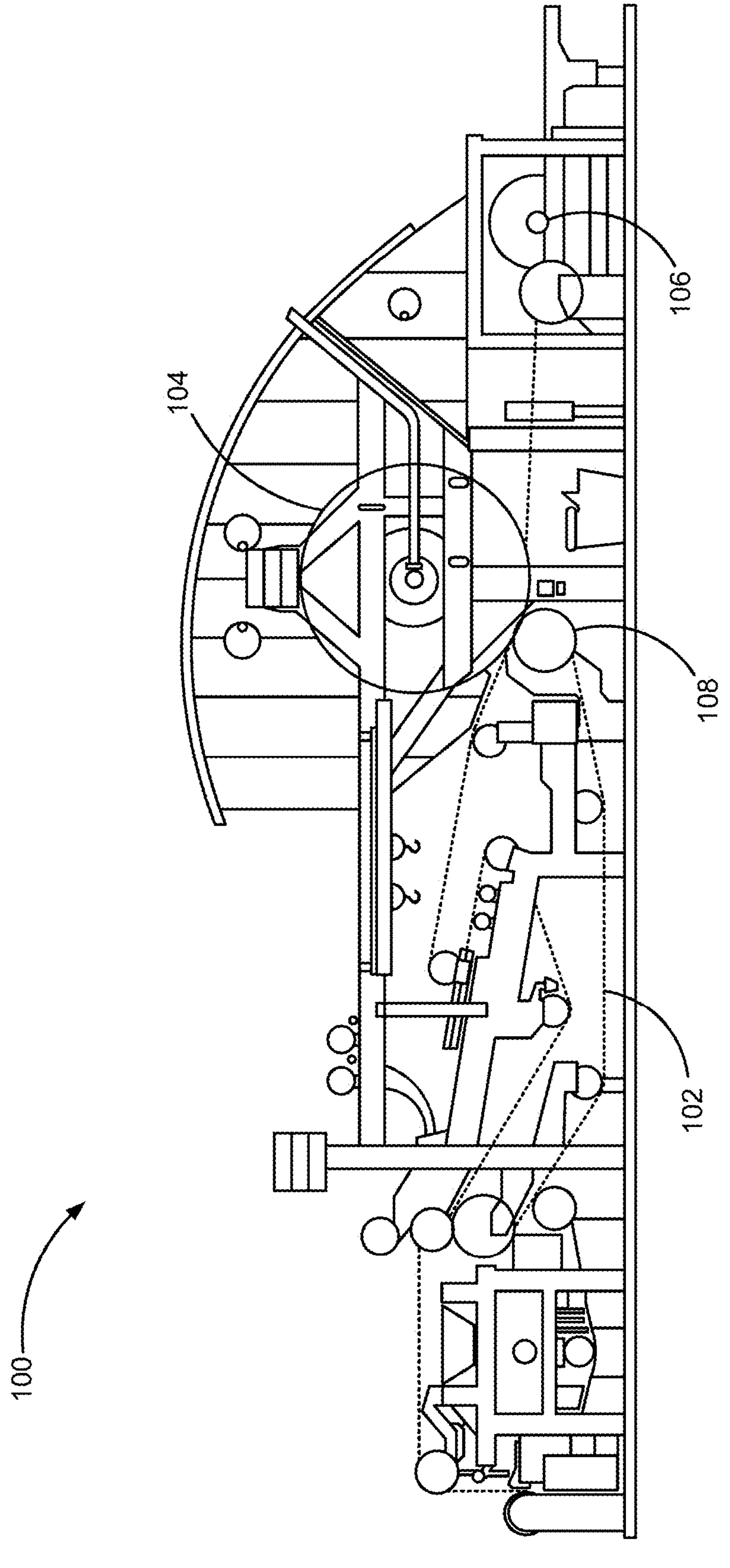
FIG. 1 is a schematic view of a tissue making machine in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to a creping blade and a method of using the creping blade for removing a cellulosic web, or tissue, from a drum in a creping process. Specifically, the creping blade contains one or more first sections with a first coefficient of friction and one or more second sections with a second coefficient of friction, the second coefficient of friction being greater than the first coefficient of friction. A method of using the creping bade is further provided. The method includes removing a web from a drum with the creping blade. As described, the method of using the creping blade may increase the caliper of the final tissue product.

The creping blade may be used to increase the number and/or dimension of microfolds and macrofolds in the tissue, thereby increasing the caliper of the final tissue product. Caliper, as used herein, is a term of art that refers to the thickness of the base paper produced.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as “substantially”, “about” and “approximately” when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording “and/or” is intended to represent an inclusive-or. That is, “X and/or Y” is intended to mean X or Y or both, for example. As a further example, “X, Y, and/or Z” is intended to mean X or Y or Z or any combination thereof.

It should be noted that the term “coupled” used herein indicates that two elements can be directly coupled to one another or coupled to one another through one or more intermediate elements.

Reference is first made to FIG. 1, which illustrates a schematic view of a tissue making machine 100.

Generally, tissue products are manufactured by a process that includes the blending of pulp, either from wood fiber, bamboo, wheatgrass, elephant grass, recycled materials or any combination of the aforementioned sources. The materials are soaked and pulled apart in a mixing tank with a large quantity of water. Additives may be included by the manufacturer to increase the softness, strength, or colour of the paper products, such as spray softeners and Yankee coatings.

Figure 2:
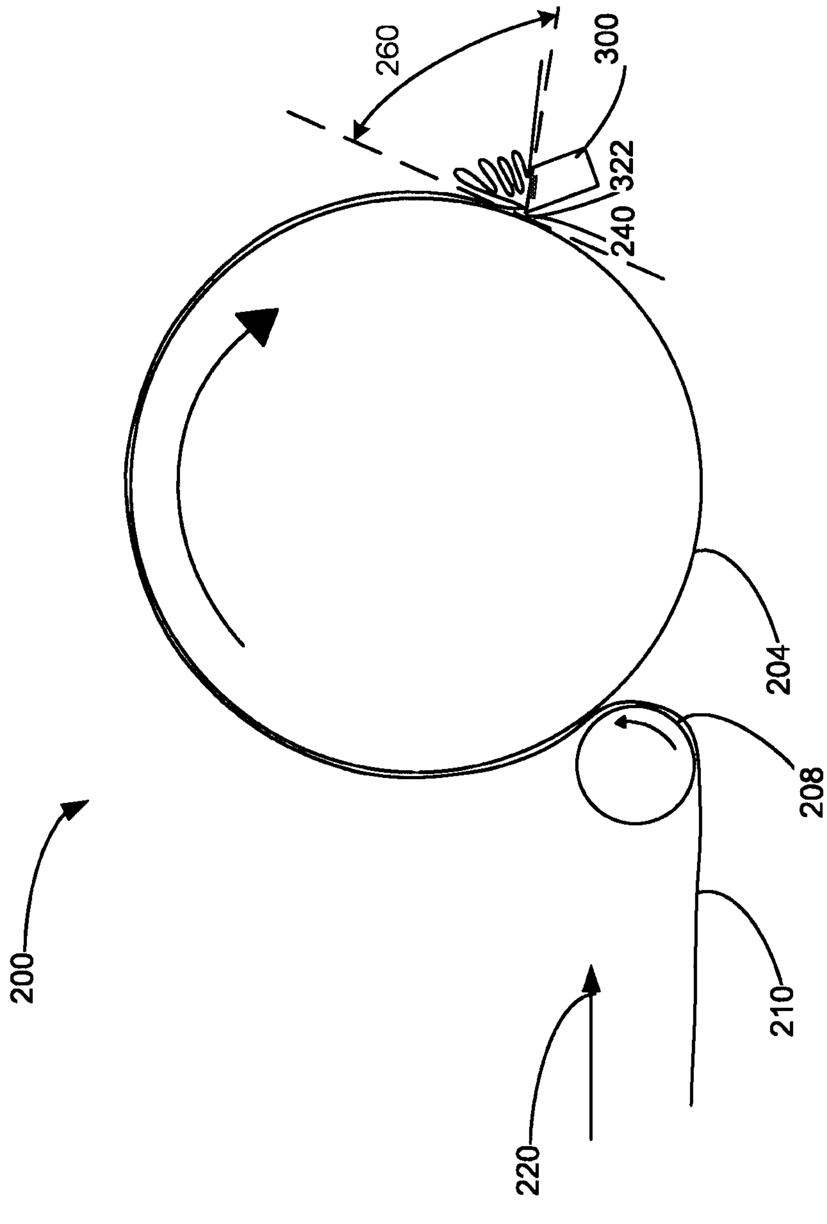
FIG. 2 is a schematic view of a creping blade in contact with a drum in accordance with an example embodiment.

Referring still to FIG. 1, the tissue making machine 100 has a moving belt 102 for receiving the mixture of liquid and pulp. The moving belt 102 is used for assisting with the removal of excess liquid from the pulp mixture. As the liquid from the pulp mixture is removed, the pulp fibers link together to form a web. After a portion of the liquid is removed from the mixture, the web is carried on the moving belt 102 in a machine direction 220 (i.e., along the direction of motion of the moving belt 102) to a drum 104. The web is pressed into and transferred to the drum 104 by a nip 108. For example, the nip 108 may be a suction pressure roll. The drum 104 is used to remove additional water from the pulp mixture. After the web has been rotated along the drum 104, the web is then scraped from the drum 104 by a creping blade 300, as shown in FIG. 2, and transferred to a core to form a reel 106 of paper. The reel 106 may create a pulling action to assist with the removal of the web from the drum 104.

The drum 104 may be any drum used in the paper making process. For example, the drum 104 may be referred to as a Yankee drum or Yankee dryer. The Yankee dryer may be a steam heated rotating cylinder to dry the web by conducting heat. The Yankee dryer may provide a platform upon which the creping process occurs.

The process implemented by system 100 may be referred to as a classic, traditional, or light dried crepe tissue making process. The creping blades described and claimed herein are equally applicable to through-air-dried and other processes for making tissue. For example, the creping blade may be used in Double-Re-Crepe machines and/or Wet Crepe machines.

Reference is next made to FIG. 2, which illustrates an exemplary system 200 including a creping blade 300 and a drying drum 204. The creping blade 300 is in contact with the drum 204 in accordance with an embodiment.

The creping blade 300 extends the width of the drum 204 in the cross direction 230, the cross direction 230 being parallel to the axis of rotation of the drum 204 and perpendicular to the machine direction 220. The creping blade 300 has a creping blade tip 322 having a scraping edge 323 for removing a web 210 from the drum 204. The creping process scrapes the web 210 from the drum 204 with the creping blade 300. As the web 210 travels around the drum 204, it contacts the creping blade 300 and is removed from the drum 204.

The process of creping the web 210 from the drum 204 may distort and expand the web 210 in the Z-direction (i.e., perpendicular to both the machine direction 220 and the cross direction 230) to increase the thickness and/or caliper of the web 210. Fibers within the web 210 may buckle and bend upon contact with the creping blade 300. The bending of the web 210 may release the web 210 from the drum 204 surface for a short distance, thereby forming a small fold in the tissue, called a crepe, as illustrated in FIGS. 12A-13B. A small size of crepe may be referred to as a microfold 216. A plurality of collected microfolds 216 may form a larger crepe, which may be referred to as a macrofold 218. Increasing the number and/or size of crepes in the web 210 may result in a tissue product of increased caliper.

Several factors may have an impact on the crepe, including, but not limited to, the fiber choice, the coating of the drum, the sheet drying process, the crepe pocket geometry, the rate of rotation of the reel, the rate of rotation of the drum, the basis weight, the dryness of the sheet at the point of contact with the blade, the types of additives, and the creping blade material.

The creping blade 300 may be made of, including, but not limited to, steel, ceramic, carbide, or a combination thereof. In some embodiments, the creping blade 300 may be made of a plurality of materials. For example, a portion of the creping blade 300 may be made of steel, while the creping blade tip may be made of ceramic. A creping blade with a smoother surface may produce a tissue product with a smaller crepe.

Possible drum coatings may include a adhesives, release agents, coating modifiers or a combination of these and other coatings. The combination of the aforementioned blends may provide soft and/or hard coatings with low and/or high adhesive characteristics. The drum coating may be added continually onto the drum 204 and will build up through extended use. In some embodiments, the creping blade 300 may be positioned such that the creping blade 300 contacts the drum coating of the drum 204 and not the drum 204 itself.

As the web 210 is rolled up in the reel 106, the web 210 may be stretched in the machine direction 220. The stretching of the web 210 may remove some of the folds generated by the creping blade 300, thereby reducing the caliper of the tissue product. The stretching of the web 210 may be used to control the slack in the web 210 between the drum 204 and the reel 106. The rotation speed of the reel may be varied to control the stretch of the web. For example, if a larger crepe is generated, the reel speed may be increased to stretch the web 210 while also preventing the stretched material from having too much slack. Excess slack between the drum 204 and the reel 106 may result in the web 210 tearing. The reel 106 may be rotated independently from the drum 204 to control the amount of stretch and slack in the web 210.

The web 210 of the tissue making process has a basis weight that is a function of the amount of material used to form the web 210. For example, a lower basis weight means that less material per unit area of the web 210 is used to form the web 210. In some embodiments, the basis weight of the web 210 may be lowered by producing smaller crepes in the tissue product. Similarly, the basis weight of the web 210 may be increased by increasing the size of the crepe, thereby creating a bulkier tissue product. In some embodiments, the crepe may be increased and then stretched, thereby producing a web having increased caliper without changing the basis weight.

As shown in FIG. 2, a crepe pocket 240 is formed between the crepe blade tip 222 and the surface of the drum 204. The angle between the drum 204 and the shelf 320 of the creping blade 300, referred to as the pocket angle 260, may alter the size of the crepe pocket 240. The size of the crepe pocket 240 may alter the properties of the final tissue product. A larger crepe pocket 240 is formed if the pocket angle 260 is greater than 90°, which may provide a thinner and softer final tissue product. A smaller crepe pocket 240 is formed if the pocket angle 260 is less than 90°, which may provide a thicker final tissue product. Typically, a thicker final product is less soft than a thinner product.

A blade holder (not shown) may be used to hold the creping blade 300 against the coating of the drum 204. A blade holder is a mechanical device that holds the creping blade 300 securely in place at a blade working angle against the surface of the drum 204. The blade working angle is defined as the angle between the drum 204 and a side closest the drum 204 of the creping blade 300. A blade working angle of less than 15° may make it more difficult to detach the web from the drum 204 effectively, and a blade working angle greater than 20° may cause increased friction and wear on the drum 204.

Figure 3:
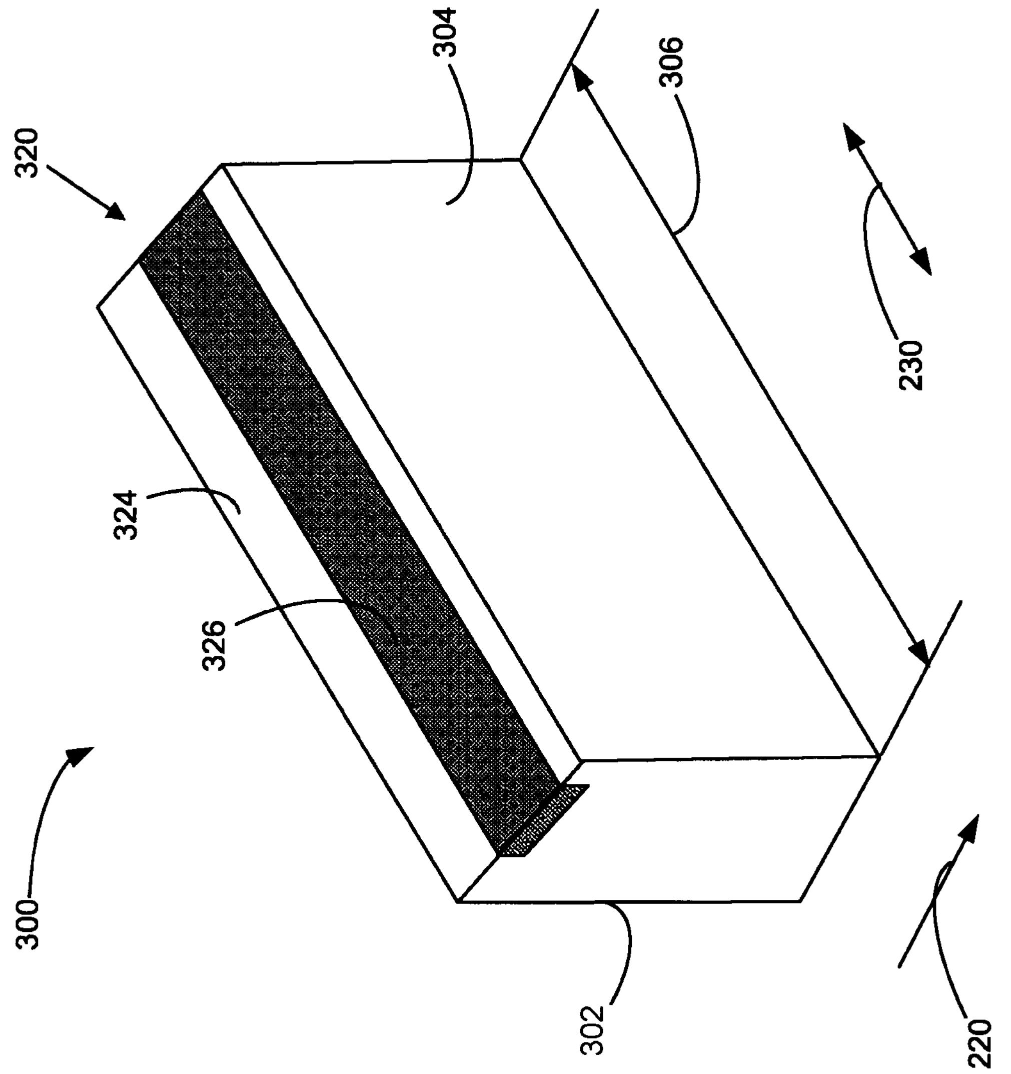
FIG. 3 is a perspective view of a creping blade in accordance with an example embodiment.

As exemplified in FIG. 3, the creping blade 300 has a first side face 302, a second side face 304 and a shelf 320 extending from the first side face 302 to the second side face 304. As shown, the first side face 302 and the second side face 304 may be generally parallel. In some embodiments, the first side face 302 and the second side face 304 may be at an angle relative to each other.

The creping blade tip 322 is located proximate the first side face 302 and the shelf 320, with the scraping edge 323 formed at the intersection of the first side face 302 and the shelf 320. The position of the creping blade tip 322 relative to the drum 204 may vary depending on desired use of the creping blade 300. For example, the creping blade tip 322 may be used to physically contact the drum 204 for removal of the web 210. In another embodiment, the creping blade tip 322 may be used to remove the web 210 without contacting the drum 204. For example, the creping blade tip 322 may contact the drum coating without contacting the drum 204.

Referring still to FIG. 3, as exemplified, the shelf 320 may be beveled with respect to the first side face 302, thereby forming a bevel angle 340. The bevel angle 340 may be in the range of about 60° to about 90°. The bevel angle 340 may be used to form a preferred size of crepe pocket 240. A bevel angle between 60° and 90° may form a larger crepe pocket 240, while a bevel angle greater than 90° may form a smaller crepe pocket 240. The bevel angle 340 may influence the stretch of the tissue product. A larger bevel angle 340 may create a tissue product with greater stretch than a smaller bevel angle. For example, a bevel angle 340 of 90° may have a larger sheet stretch than a bevel angle 340 of 65°.

The shelf 320 of the creping blade 300 includes a first section 324 and a second section 326. The first section 324 has a first coefficient of friction and the second section 326 has a second coefficient of friction. The second coefficient of friction is greater than the first coefficient of friction.

For example, the first section 324 may be a smooth surface and the second section 326 may be a rough surface. Accordingly, the second section 326 has a greater coefficient of friction than the first section 324. For example, the second section 326 may be formed by sandblasting the shelf 320 to form a rougher surface than the first section 324. The second section 326 may be formed by etching, abrasion or any means, including, but not limited to, sanding, sand blasting, acid etching, water etching, laser etching, chemical etching, or any combination of the aforementioned or other means.

In some embodiments, there may be a transition section between the first section 324 and the second section 326. The transition section may have a gradated coefficient of friction that begins with the first coefficient of friction and ends with the second coefficient of friction, thereby creating a more incremental transition between the first section 324 and the second section 326. In some embodiments, the transition may be gradual. In some embodiments, as exemplified in FIG. 3, the transition between the first section 324 and the second section 326 may be abrupt.

Figure 4B:
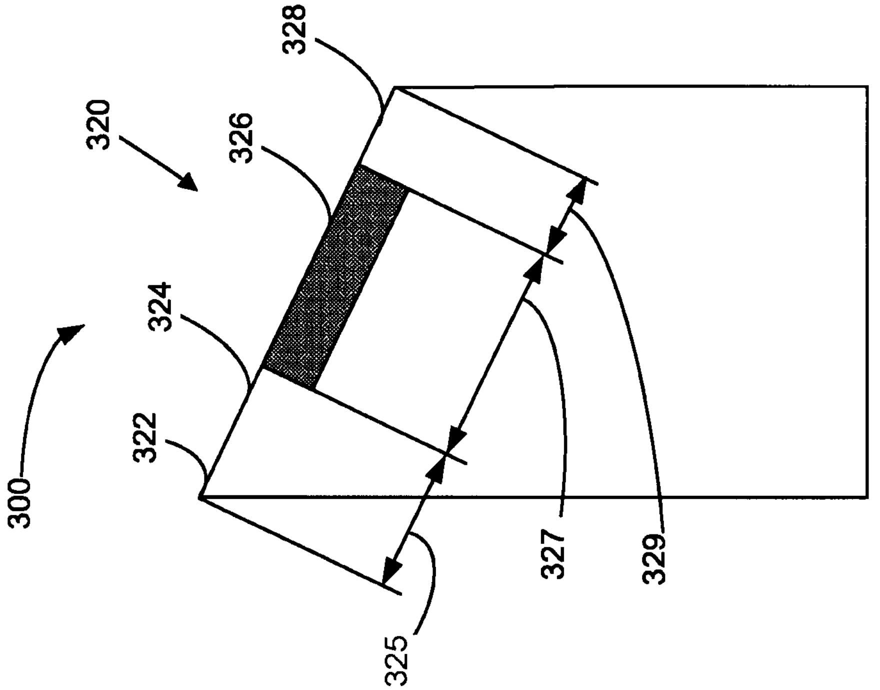
FIGS. 4A and 4B are side views of the creping blade of FIG. 3.
Figure 4A:
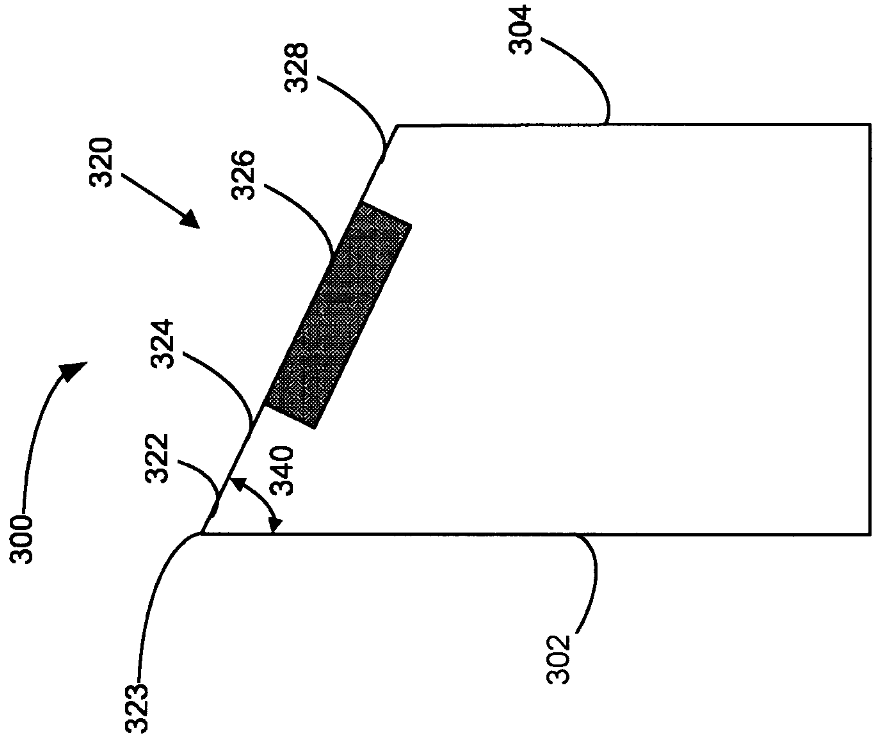

The creping blade 300 may include a third section 328. As exemplified in FIGS. 4A and 4B, the third section 328 may extend from the second section 326 to the second side face 304. The third section 328 has a third coefficient of friction. The third coefficient of friction may vary depending on the desired use of the creping blade 300. For example, the third coefficient of friction on may have a value between that of the first coefficient of friction and the second coefficient of friction, a coefficient of friction that is higher than the second coefficient of friction, or a coefficient of friction that is less than the first coefficient of friction. In some embodiments, the third coefficient of friction may be the same as the first coefficient of friction. In such embodiments, the properties of the first section 324 and the third section 328 may be the same. In some embodiments, as shown in FIGS. 3, 4A, and 4B, the third section 328 may extend along the same plane as the shelf 320.

The creping blade 300 as shown herein may be used to increase the crepe of the tissue product. For example, as the web 210 contacts the first section 324 of the creping blade 300, a microfold may begin to form. As the web 210 continues to the second section 326 of the creping blade 300, further microfolds may form, thereby forming at least one macrofold. The second coefficient of friction on the second section 326 being higher than that of the first coefficient of friction on the first section 324 provides a higher friction force on the web 210 as it moves across the creping blade 300, which slows the web down as it moves from the first section 324 to the second section 326. This slowing action results in the web 210 bunching, thereby allowing more microfolds and macrofolds to be formed within the web 210. Increasing the number of microfolds and/or macrofolds may result in a tissue product with increased caliper.

The ability to increase the caliper of the web 210 through use of the creping blade 300 may allow for other parameters in the tissue making process to be altered, while maintaining and/or increasing a desired caliper of the tissue product. In other words, the ability to control the caliper using the creping blade 300 provides additional flexibility to the tissue making process by allowing, for example, the basis weight, moisture content, pocket angle, and/or level of mechanical drying to be varied. It will be appreciated that other factors that influence the caliper of the web 210 may also be varied. Varying these parameters may result in an improved tissue product and increased cost savings in the tissue making process.

For example, in some embodiments, the basis weight of the web may be lowered while maintaining and/or increasing a desired caliper of the final tissue product. A lower basis weight would typically result in a decrease in caliper of the tissue product. However, due to the ability of the creping blade 300 to increase the caliper of the web 210, the basis weight may be lowered while maintaining the desired caliper of the tissue product. In other words, the decrease in caliper that would typically arise as a result of decreasing the basis weight may be offset by the increase in caliper provided by the creping blade 300 in accordance with any embodiment described herein. Accordingly, the end product may have the same caliper at a lower basis weight. Reducing the basis weight may decrease the costs associated with the tissue making process. For example, lowering the basis weight means that less material may be required to form the same amount of tissue product, resulting in a reduction in material costs. Additionally, the use of less material results in less energy needed for drying the web 210, thereby reducing the energy costs of the tissue making process. Furthermore, reducing the amount of resources and energy may provide an environmental benefit.

In some cases, use of the creping blade 300 may allow the moisture content of the web 210 to be at a higher level when the web 210 contacts the creping blade 300 while maintaining and/or increasing the desired caliper of the tissue product. For example, a higher moisture content of the web 210 during the creping process typically results in a tissue product of decreased caliper. Accordingly, more energy is used to dry the web 210 to reduce the moisture content at the creping blade during the creping process in order to maintain the desired caliper of the tissue product. Using the creping blade 300 in accordance with any embodiment described herein, the web 210 may have a higher moisture content upon contact with the creping blade 300, without decreasing the caliper of the tissue product. In other words, the typical reduction in caliper due to the increase in moisture content at the creping blade may be offset by the increase in caliper produced by the creping blade 300. Increasing the moisture content of the web 210 at the creping blade 300 may require less energy to dry the web 210, thereby resulting in energy savings without reducing the desired caliper of the tissue product.

In some embodiments, use of the creping blade 300 to increase the caliper of the web 210 may allow for an increase in the amount of mechanical drying while maintaining and/or increasing the desired caliper of the tissue product, thereby allowing other drying steps to be modified to reduce energy consumption or improve the quality of the finished tissue. For example, the web 210 undergoes mechanical drying by pressing the web 210 into the drum 204 through use of the nip 108. Increasing the pressure to increase the mechanical drying of the web 210 results in a tissue product of decreased caliper due to the increased compression of the web 210. The more the web 210 is compressed, the lower the resultant caliper of the tissue product. Using the creping blade 300 in accordance with any embodiment described herein, may allow the suction pressure to be reduced while still producing a tissue of equal or higher caliper.

In some embodiments, the pocket angle 260 may be varied to control the softness of the tissue product while maintaining and/or increasing the desired caliper of the tissue product. For example, a larger pocket angle 260 (e.g., approximately 90°) may result in increased softness but decreased bulk. To increase the bulk of the tissue product, the pocket angle 260 may be decreased. Using the creping blade 300 in accordance with any embodiment described herein, the pocket angle 260 may be kept relatively open (e.g., approximately 90°) to increase the softness of the tissue while maintaining the desired caliper of the tissue product. In other words, the decrease in caliper resulting from the increased pocket angle 260 may be offset by the increase in caliper provided by the creping blade 300. Accordingly, the caliper of the tissue product may be maintained while increasing the softness of the tissue through variation of the pocket angle 260. The pocket angle 260 may range from about 70° to about 90°.

In some embodiments, the creping blade 300 may have a consistent surface profile in the cross direction 230. This design may decrease the likelihood of tearing the tissue product. For example, many conventional creping blades contain undulations in the cross direction at the scraping edge to assist with the creping process and reduce wear of the creping blade. However, these undulations may result in lines or scores being produced within the final tissue product. As the web is stretched and rolled up, these lines may increase the likelihood of tearing of the tissue produce.

Accordingly, the consistent cross directional surface of the creping blade 300 may reduce the likelihood of producing lines, thereby reducing the chances of tearing of the tissue product.

Figure 5:
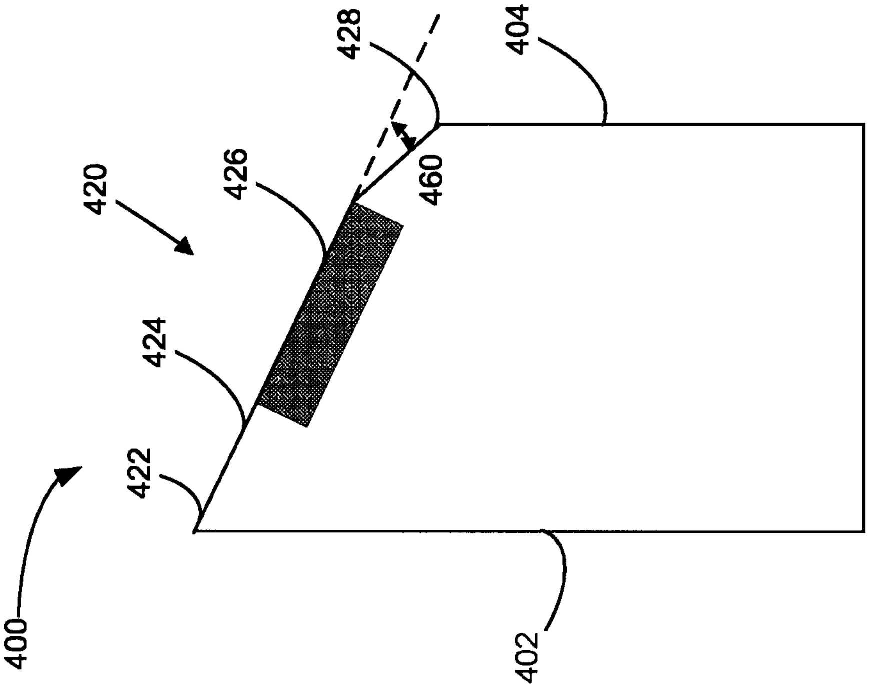
FIG. 5 is a side view of another example embodiment of a creping blade with an angled section.

Referring to FIG. 5 shown therein is another exemplary embodiment of a creping blade 400. For ease of understanding, like elements have been numbered with like reference numbers with an incremented difference. As exemplified in FIG. 5, the third section 428 may be formed to extend at an angle from the shelf 420, thereby forming a third section angle 460. Implementation of an angled third section 428 may, for example, reduce blade costs and/or ease of manufacturing procedures.

Figure 6:
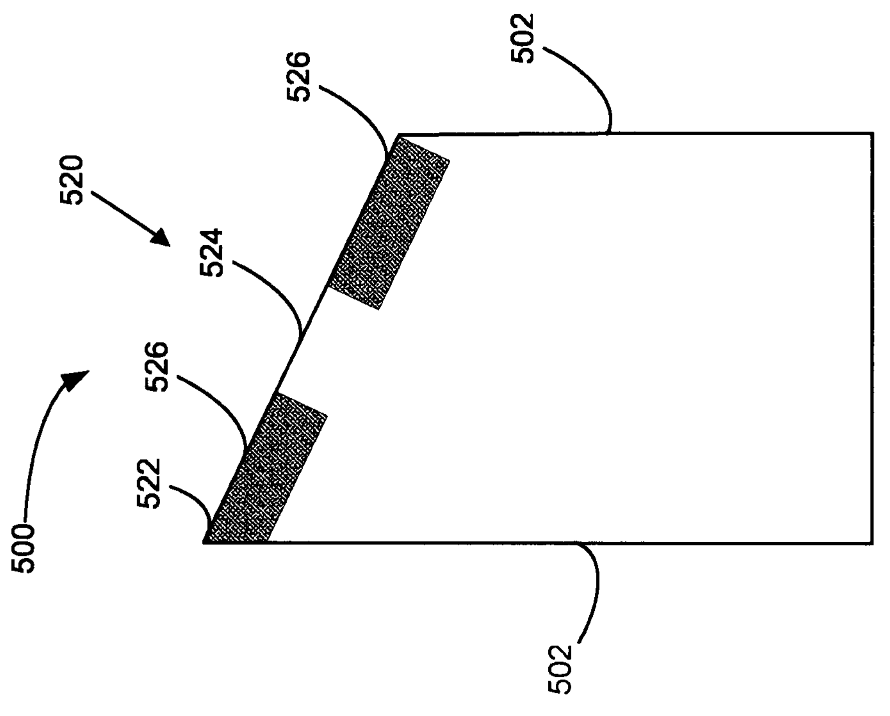
FIG. 6 is a side view of another example embodiment of a creping blade with two second sections.

The quantity of first sections 324 and second sections 326 may vary. For example, in some embodiments, there may be a plurality of first sections 324. In some embodiments, there may be a plurality of second sections 326. For example, as shown in FIG. 3, the creping blade 300 has a single first section 324 and a single second section 326. The second section 326 is positioned between the first section 324 and the third section 328. As exemplified in FIG. 6, a creping blade 500 has a single first section 524 and two second sections 526.

The configuration of the first sections 324 and the second sections 326 may also vary. As shown in FIGS. 3 and 4A, the first section 324 may be positioned proximate the creping blade tip 322. The second section 326 may be spaced apart from the creping blade tip 322 by the first section 324.

Figure 7:
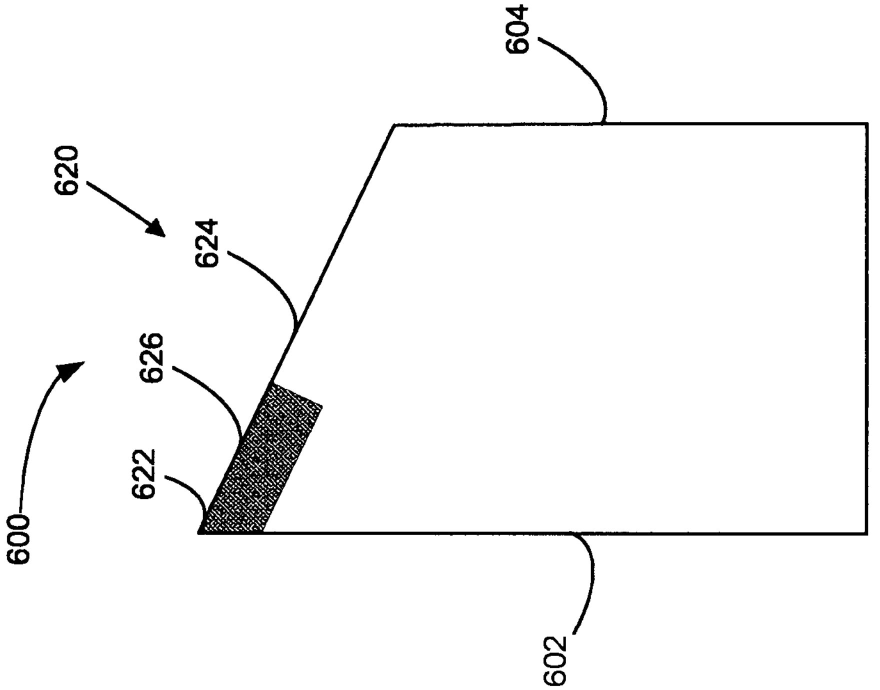
FIG. 7 is a side view of another example embodiment of a creping blade with a second section proximate a creping blade tip.
Figure 8:
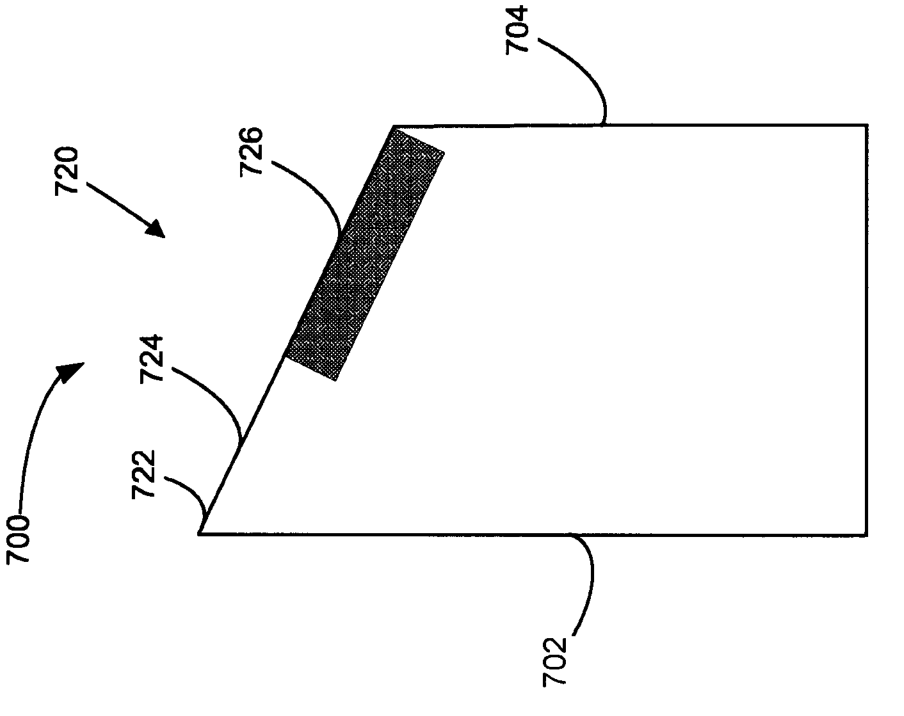
FIG. 8 is a side view of another example embodiment of a creping blade with a first section and a second section.

In another embodiment, as exemplified in FIG. 7, a creping blade 600 has a second section 626 that is positioned proximate to the creping blade tip 622 such that the first section 624 is spaced apart from the creping blade tip 622 by the second section 626. In some embodiments, as exemplified in FIG. 8, the second section 726 of the creping blade 700 may extend from the first section 724 to the second side face 704.

Referring to FIG. 4B, the first section 324 has a first length 325 along the plane of the shelf 320 and the second section 326 has a second length 327 along the plane of the shelf 320. The first length 325 and the second length 327 may vary depending on the desired use of the creping blade 300. As exemplified in FIG. 4B, the third section 328 has a third length 329 along the plane of the shelf 320.

Figure 9:
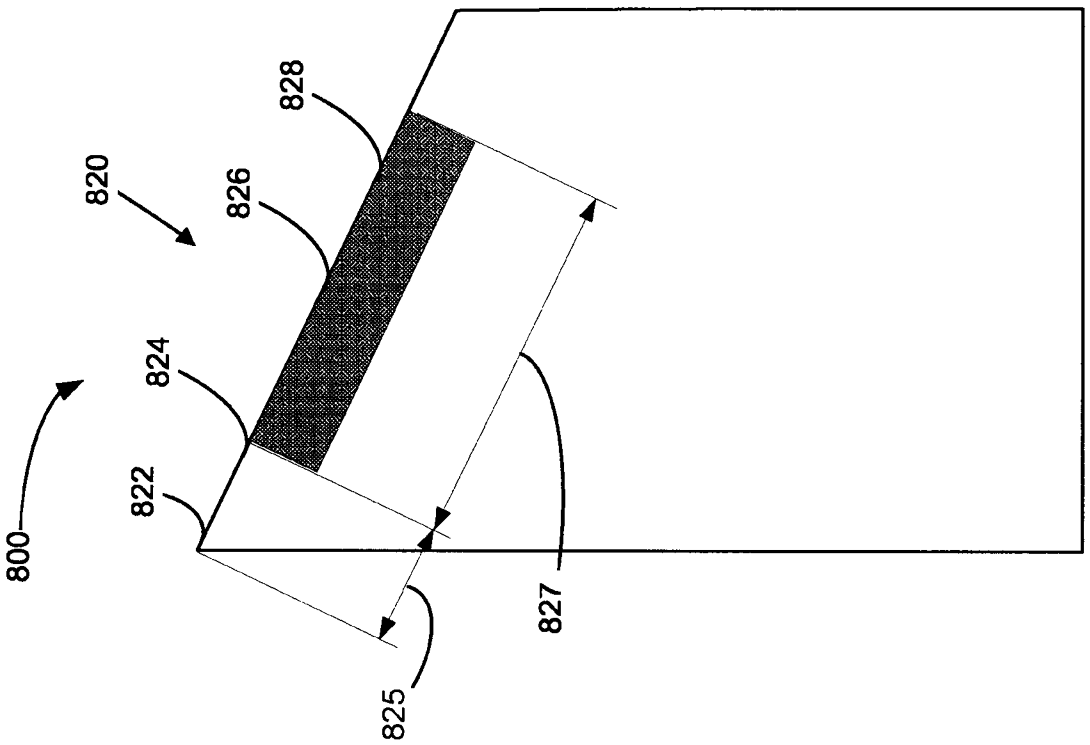
FIG. 9 is a side view of another example embodiment of a creping blade with a second section having an increased length.

The ratio of first length 325 to second length 327 may also vary depending on the desired use of the creping blade 300. In some embodiments, as exemplified in FIG. 9, a creping blade 800 has a second length 827 of a second section 826 that is approximately three times the length of the first section 824.

In some embodiments, the first length 325 of the first section 324 may be approximately three times the length of the average wear on the creping blade 300. The average wear may be defined as the reduction in the length of the creping blade, from the scraping edge along the machine direction 220, during the average duration of use of the creping blade. For example, if a creping blade is typically used for a duration of 1 hour, the average wear would be the amount the blade is worn in the machine direction 220 over the course of the hour. Accordingly, a safety factor may be included with regards to the length 325 of the first section 324, such as the length 325 being three times the average wear. This value for the first length 325 may ensure that even after the creping blade 300 has been worn down with use, there remains enough first length 325 to maintain the advantages of the creping blade 300. For example, the increased caliper, softness, and/or strength of the product may be maintained despite wear of the creping blade 300. Additionally, a sufficient length 325 of the first section 324 may prevent the second section 326 from contacting the drum 204, thereby helping to prevent damage to the drum during the creping process.

Figure 10:
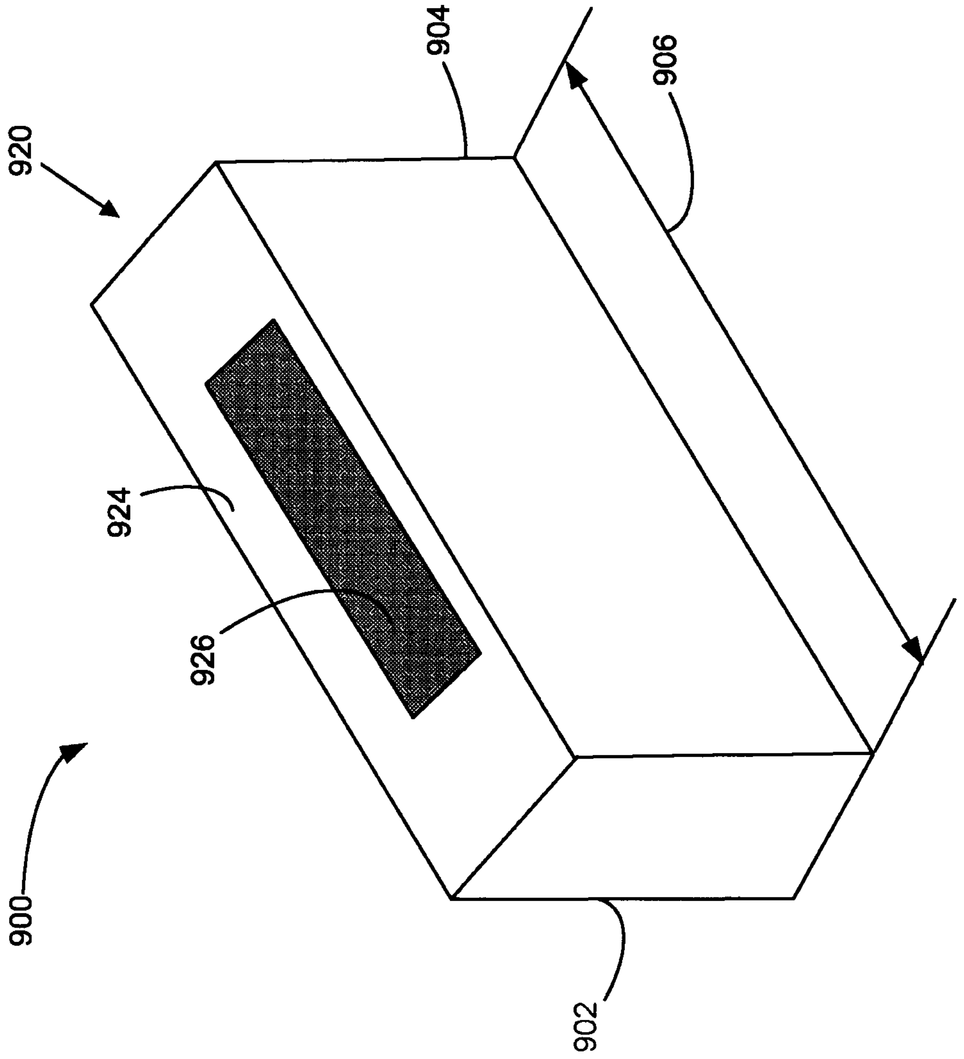
FIG. 10 is a perspective view of another example embodiment of a creping blade with a second section that is staggered along a width of the creping blade.
Figure 11:
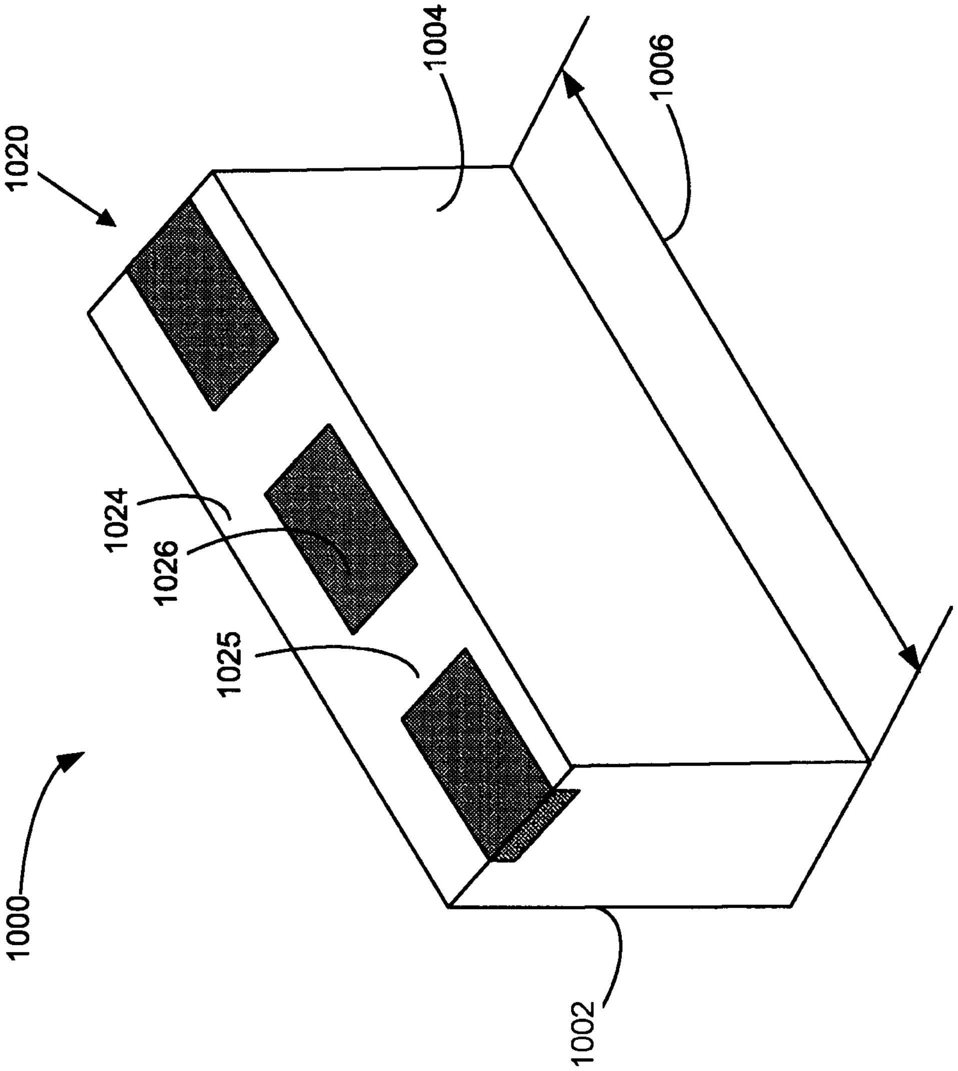
FIG. 11 is a perspective view of another example embodiment of a creping blade with a second section that extends a partial width of the creping blade.
Figure 12A:
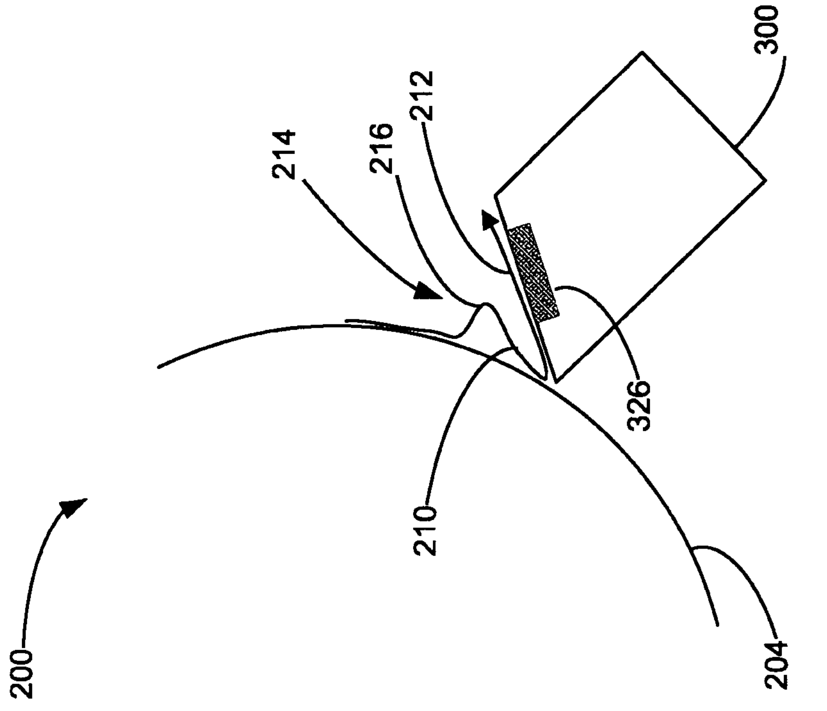
FIGS. 12A-13B are schematic views of stages of the creping process.
Figure 12B:
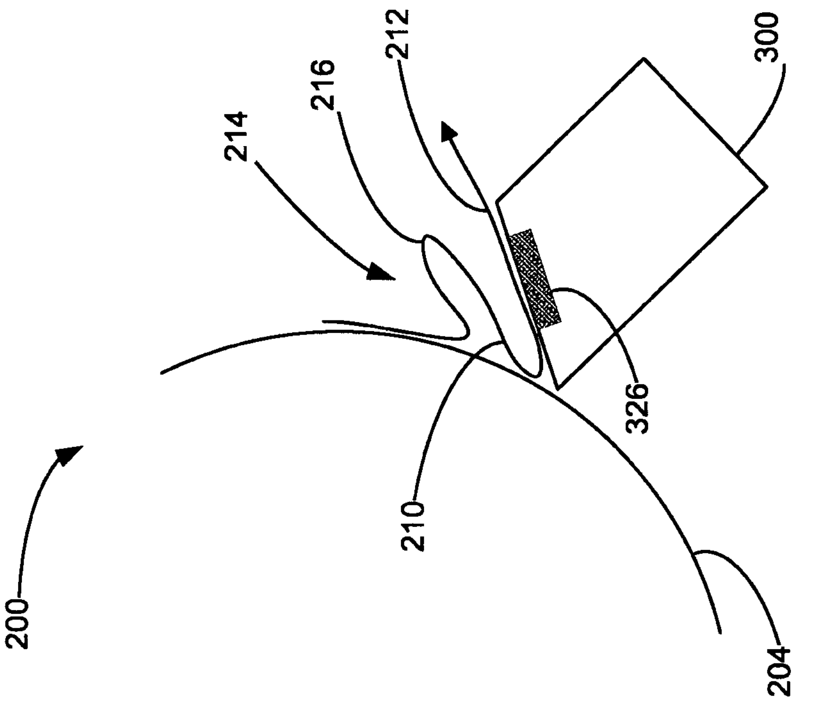
Figure 13B:
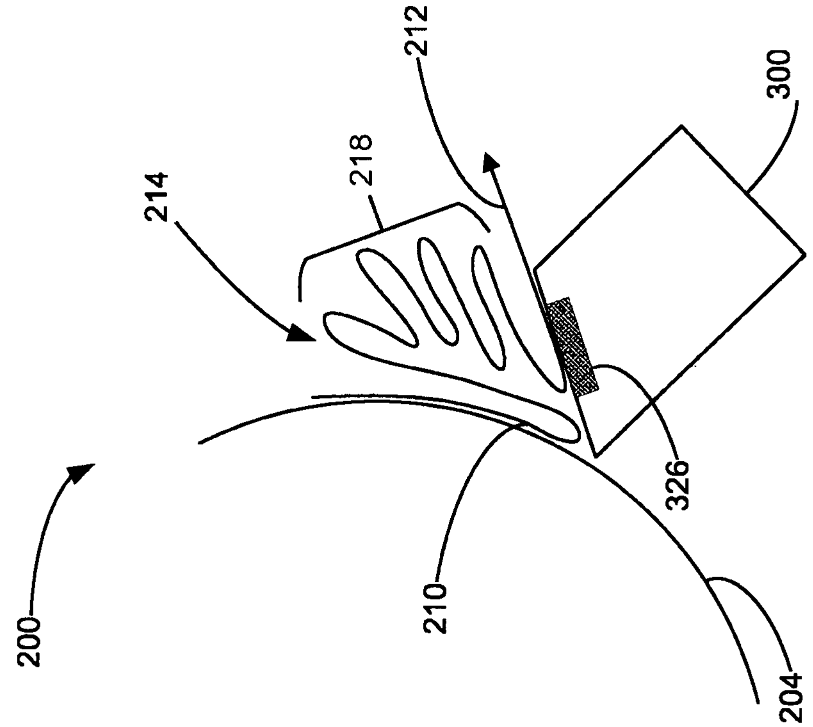
Figure 13A:
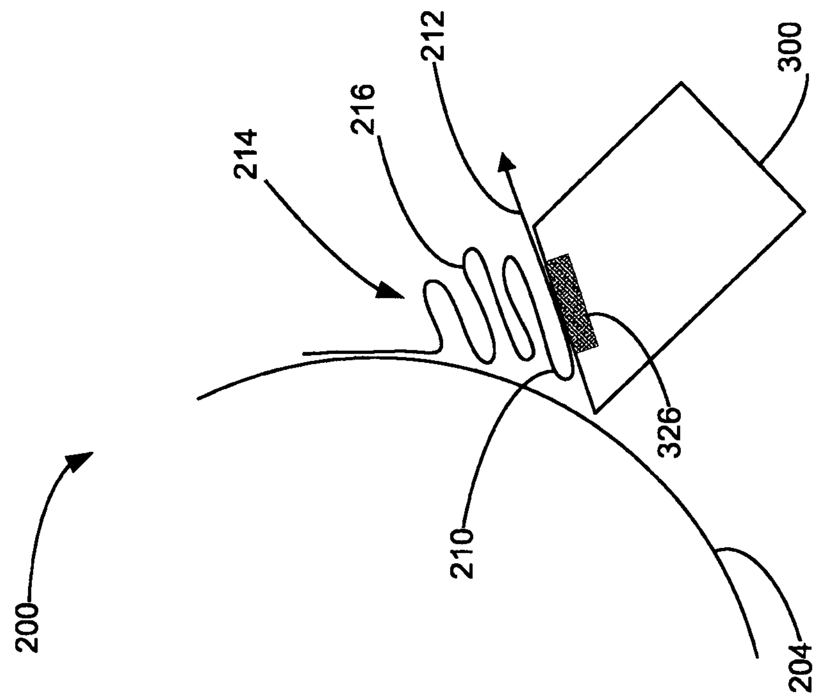

The first section 324 and the second section 326 may span the entirety of the creping blade width 306 in the cross direction 230, as shown in FIG. 3. In some embodiments, as exemplified in FIG. 10, the first section 924 and/or the second section 926 may span only a partial width 906 of the creping blade 900 in the cross direction 230. In some embodiments, as exemplified in FIG. 11, the first section 1024 and the second section 1026 of the creping blade 1000 may alternate along the width 1006 in the cross direction 230. For example, there may be a gap 1025 in the cross direction 230 between successive second sections 1026. It will be appreciated that there may be any pattern of first sections 324 and second sections 326.

Method of Creping a Web

Figure 14:
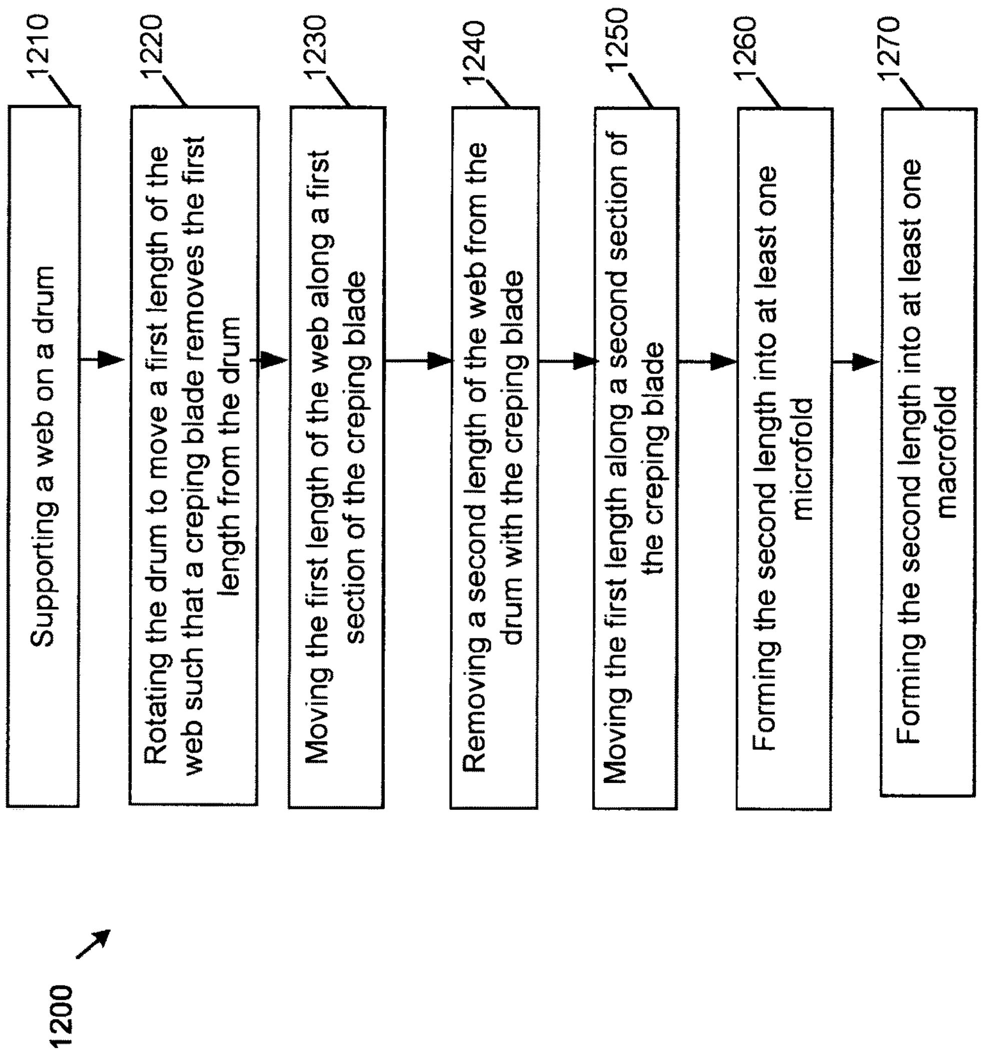
FIG. 14 is a flow chart of an exemplary method of using a creping blade.

Referring to FIG. 14, shown therein is a flow chart of a method 1200 of increasing the caliper of a web by removing the web using a creping blade as described herein.

At act 1210, a web 210 is provided and supported on a drum. As described previously, the web 210 is a cellulosic pulp and liquid mixture.

At act 1220, the drum is rotated to move a first web length 212 of the web 210 proximate to the creping blade 300 such that the creping blade 300 removes the first web length 212 from the drum 204. As shown in FIGS. 12A-13B, the creping blade as exemplified is the creping blade 300. The creping blade may be any creping blade described herein. The creping blade 300 has a first section 324 with a first coefficient of friction and a second section 326 with a second coefficient of friction, the second coefficient of friction being greater than the first coefficient of friction.

At act 1230, the first web length 212 is moved along the first section 324 of the creping blade 300. The lower coefficient of friction of the first section 324 may allow the first web length 212 to move at a first speed along the creping blade 300.

At act 1240, a second web length 214 of the web 210 is removed from the drum 1104 with the creping blade 300.

At act 1250, the first web length 212 is moved to contact the second section 326 of the creping blade 300. As the first web length 212 contacts and moves along the second section 326, the first web length 212 moves at a second speed along the creping blade. Due to the higher coefficient of friction of the second section 326, the second speed is lower than the first speed. In other words, the higher coefficient of friction of the second section 326 acts as a grip to hold the web 210, thereby slowing the first web length 212.

At act 1260, the second web length 214 is formed into one or more microfolds 216, as exemplified in FIG. 12B-13B. The one or more microfolds 216 are formed in the second web length 214 by the reduction in speed of the first web length 212 as the first web length 212 contacts the second section 326. The reduction in speed of the first web length 212 may cause the second web length 214 to begin bunching and/or folding, thereby forming one or more microfolds in the second web length 214.

At act 1270, the second web length 214 is formed into one or more macrofolds 218. The macrofolds 218 may be caused by the continual bunching of the second web length 214. For example, in some embodiments, a plurality of microfolds 216 is formed in the second web length 214. The plurality of microfolds 216 together may cause the formation of one or more macrofolds 218.

The microfolds 216 and macrofolds 218 may be formed in an inconsistent pattern, for example, wherein one macrofold is interspersed with a plurality of microfolds. The increased amount of microfolds and macrofolds that may be produced by the creping blade as described in any of the above embodiments may result in an increased caliper of the final tissue product.

Various embodiments have been described herein by way of example only. Various modification and variations may be made to these example embodiments without departing from the spirit and scope of the invention, which is limited only by the appended claims.

We claim:

1. A creping blade comprising:
a first side face, a second side face, and a shelf extending from the first side face to the second side face; and
a scraping edge at the intersection of the first side face and the shelf, wherein the shelf is made of a base material having a first section and a second section, the base material at the first section having a first coefficient of friction and the base material at the second section being processed to produce a second coefficient of friction that is greater than the first coefficient of friction.

2. The creping blade of claim 1, wherein the first section is positioned proximate to the scraping edge.

3. The creping blade of claim 1, wherein the second section is spaced apart from the scraping edge by the first section.

4. The creping blade of claim 1, wherein the second section is placed proximate to the scraping edge.

5. The creping blade of claim 1, wherein the first section is spaced apart from the scraping edge by the second section.

6. The creping blade of claim 1, wherein the shelf extends at an angle from the first side face which, when the creping blade is in contact with a drum, forms a wear angle between the drum and the scraping edge.

7. The creping blade of claim 1, wherein the shelf further comprises a third section, the third section extending from the second section to the second side face.

8. The creping blade of claim 7, wherein the third section extends from the second side face to the second section at an angle relative to the second section.

9. The creping blade of claim 1, wherein the first section has a first length, the second section has a second length, and the second length is at least three times the first length.

10. The creping blade of claim 1, wherein the creping blade is made of steel.

11. The creping blade of claim 1, wherein the creping blade is made of ceramic.

12. The creping blade of claim 1, further comprising a ceramic tip that forms the scraping edge.

13. The creping blade of claim 1, wherein the base material of the shelf at the second section is processed by at least one of etching and abrasion.

* * * * *